United States Patent [19]
Yokoyama

[11] Patent Number: 4,875,734
[45] Date of Patent: Oct. 24, 1989

[54] AUTOMOTIVE SEAT
[75] Inventor: Sho Yokoyama, Akishima, Japan
[73] Assignee: Tachi-S Co., Ltd., Tokyo, Japan
[21] Appl. No.: 139,784
[22] Filed: Dec. 30, 1987
[51] Int. Cl.⁴ .................................................. A47C 3/00
[52] U.S. Cl. .................................... 297/284; 297/219; 297/338; 297/458; 297/DIG. 1
[58] Field of Search ......... 297/284, 338, 219, DIG. 3, 297/DIG. 1, 337, 458

[56]  References Cited
U.S. PATENT DOCUMENTS

| | | | |
|---|---|---|---|
| 2,646,839 | 7/1953 | Hillman | 297/338 X |
| 3,511,533 | 5/1970 | Drabert | 297/337 |
| 3,784,147 | 1/1974 | Harder | 297/337 |
| 4,432,583 | 2/1984 | Russo et al. | 297/337 |
| 4,558,903 | 12/1985 | Takagi | 297/284 |
| 4,636,002 | 1/1987 | Genjiro | 297/284 |

Primary Examiner—Francis K. Zugel
Attorney, Agent, or Firm—Cushman, Darby & Cushman

[57] ABSTRACT

An automotive seat is disclosed which comprises a vertically movable seat cushion and a fixed seat back and which is capable of closing a spacing produced between the seat cushion and seat back when the seat cushion is lowered. In the automotive seat, an expandable and contractible resilient member is disposed in the portion of the seat cushion to which the lower end of the seat back faces and the resiliency of the resilient member is utilized to close the spacing between the seat cushion and seat back.

6 Claims, 3 Drawing Sheets

AUTOMOTIVE SEAT

BACKGROUND OF THE INVENTION

1. Field of the Invention

The present invention relates to an automotive seat in which only seat cushion is raised and lowered by a lifter while a seat back is fixed at a constant height.

2. Description of the Prior Art

Conventionally, there is known a seat cushion with a lifter which is adapted to raise and lower the seat cushion with respect to a seat back so as to adjust the height of an occupant's viewpoint or according to the occupant's body condition. In this type of seat cushion, as shown in FIG. 1, the seat back (21) is fixedly secured to a bracket (31) welded to a slide rail (22) and only the seat cushion (12) is raised and lowered by the lifter. For this reason, the lower position of the seat cushion (12) is set at a position which is spaced away from the seat back (21) by the maximum raising/lowering distance (stroke) of the seat cushion (12). And, a spacing (10) between the seat back (21) and the seat cushion (12), in more detail, the spacing (10) between the lower end of the seat back (21) and the rear end upper surface of the seat cushion (12) can be varied as the seat cushion (12) is raised or lowered.

The existence of the spacing (10) between the seat back (21) and the seat cushion (12) worsens the appearance of the seat as well as gives the occupant such an impression that the seat is not of fine quality. In view of this, there have been proposed a large number of seats with a lifter each of which is adapted to always close or cover such spacing (10).

Now, the lifter shown in FIGS. 1 and 2 is adapted to raise or lower the front and rear portions of the seat cushion (12) indepently of each other. Specifically, in this type of lifter, if an operation handle (32) with an anti-reversal device provided on the outside of the bracket (31) is rotated, then a pinion gear (33), which is fixed to the shaft of the operation handle (32) and disposed inside of the bracket (31), is rotated and thus a rack (34) intermeshing with the pinion gear (33) is pushed or pulled in the direction of a shown arrow, with the result that a V-shaped link (36) rotatably mounted to a shaft (35) extending across the right and left brackets (31) is rotated to thereby raise or lower the rear portion of the seat cushion (12). Also, if another operation handle (37) with an anti-reversal device is rotated, then a pinion gear (38), which is formed integrally with the shaft of the operation handle (37) and disposed inside of the brackets (31), is rotated and thus a sector-shaped gear plate (39) intermeshing with the pinion gear (38) is also rotated, so that a torque shaft (41) mounted integrally with the sector shaped gear plate (39) is rotated. Due to the rotaional movement of the torque shaft (41), a link (40) having one end welded to the torque shaft (41) is rotated to raise or lower a leg piece member (42) of the seat cushion (12) to which the other end of the link (40) is mounted, thereby raising or lowering the front portion of the seat cushion (12).

As the seat cushion with a lifter for covering the above-mentioned spacing, there is well known a structure in which a sheet is provided so as to extend between a seat cushion and a seat back. As an example of this type, there can be pointed out a structure which is disclosed in Japanese Utility Model Publication No. 53-60224. In the disclosed structure, there is provided a flexible sheet between the rear end portion of the seat cushion and the lower end of the seat back. This is a simple structure and, still more, with such structure, the spacing between the seat back and the seat cushion can be always closed.

Also, there is known another structure in which no sheet is used, but the expansion or contraction of a resilient body is used to close the above-mentioned spacing. As an example of this type, there can be shown a structure which is disclosed in Japanese Utility Model No. 60-115731. According to this structure, a resilient body is embedded into a top cover member, for example, at the lower end of a seat back or on the rear end upper surface of a seat cushion and the resilient body can be expanded or contracted freely to close the spacing. Alternatively, the resilient body is stored into a bag-shaped member and by hanging down the bag-shaped member from the lower end of the seat back or by disposing the bag-shaped member on the rear end surface of the seat cushion the spacing can be closed.

However, in the above-mentioned prior art structure using the sheet to close the spacing, when the seat cushion is raised or lowered fully, the sheet is caused to hang down backwardly, which may damage the appearance of the seat. Also, it is true that such structure offers no problem in function, but, due to the fact that the sheet is simply stretched, it lacks in a qualitative and quantitative feeling as well as in a weight feeling, that is, it is disadvantageous in that it lacks in a high-quality feeling.

Also, in the above-mentioned prior art structure in which the resilient body is stored in the bag-shaped member and the bag-shaped member is suspended down from the lower end of the seat back or the bag-shaped member is disposed on the rear end surface of the seat cushion, the bag-shaped member is located not internally but externally of the top cover member, which is not preferred in the sense of the quality of the appearance of the seat. Further, in this type of structure, due to its dependence on the use of the natural hanging-down and rising of the bag-shaped member to store the resilient body therein, it is difficult to close the spacing securely, and, in some cases, the spacing may be left unclosed. On the other hand, in the above-mentioned prior art structure in which the resilient is embedded into the seat back or seat cushion, the spacing can be securely closed. The last mentioned structure also offers no problems in the sense of the appearance quality, qualitative and quantitative feeling and weight feeling but it provides the highquality feeling.

In addition, in the above-mentioned prior art structures there is found another problem that the lifter disposed below the seat cushion can be seen from behind, which is disadvantageous in view of the apperance quality of the seat. However, in the above-mentioned well known structures including the structure in which the resilient body is embedded into the seat back or seat cushion, no attention is paid to this problem. That is, in all of the above-mentioned prior art structures, the lifter is not covered but exposed.

SUMMARY OF THE INVENTION

The present invention aims at eliminating the drawbacks found in the above-mentioned prior art structures.

Accordingly, it is an object of the invention to provide a seat cushion with a lifter which is capable of securely closing a spacing and also which provides a qualitative and quantitative feeling, a weighty feeling and a high-grade feeling as well as an excellent quality of apperance.

In order to attain this object, according to the present invention, there is arranged an expandable and contractible resilient member comprising a foam material such as urethane foam or an air bag at a position on the upper surface of the seat cushion, which faces to the lower end of a seat back, and also the resilient member is covered by a cover.

Therefore, the spacing between the rear portion of the seat cushion and the lower portion of the seat back can be covered by the resiliency of the resilient member and also, when the spacing becomes smaller, the resilient member is contracted to close the smaller spacing. That is, the spacing can be closed securely by the resilient member. And, thanks to the use of the resilient member, in the present invention, a qualitative and quantitative feeling, a weighty feeling and a high-grade feeling can be improved as well as the quality of the appearance of the seat can be improved when compared with the prior art seat cushions.

It is another object of the invention to provide an automotive seat in which a lifter used to raise or lower a seat cushion cannot be observed from behind when the seat cushion is raised by the lifter so as to eliminate the impairment of the appearance quality of the seat.

In accomplishing the above object, according to the invention, a cover for a seat cushion is formed as a dual structure in the rear end portion thereof, that is, the end portion of the cover comprises an inner cover and an outer cover, and, between the inner and outer covers, there is stored a resilient member which can be expanded or contracted according to a spacing between a seat back and the seat cushion. The front end of the inner cover is connected to the outer cover and the rear end of the inner cover is connected to a seat cushion frame. Also, the rear end of the outer cover is coupled to a fixed member which has no connection with the raising or lowering of the seat cushion. The fixed member, for example, may comprise a shaft (35) which is provided across the right and left brackets (31) shown in FIG. 2. Thus, since the lifter is covered by the outer cover, the lifter cannot be observed from behind the seat.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Figure 3:
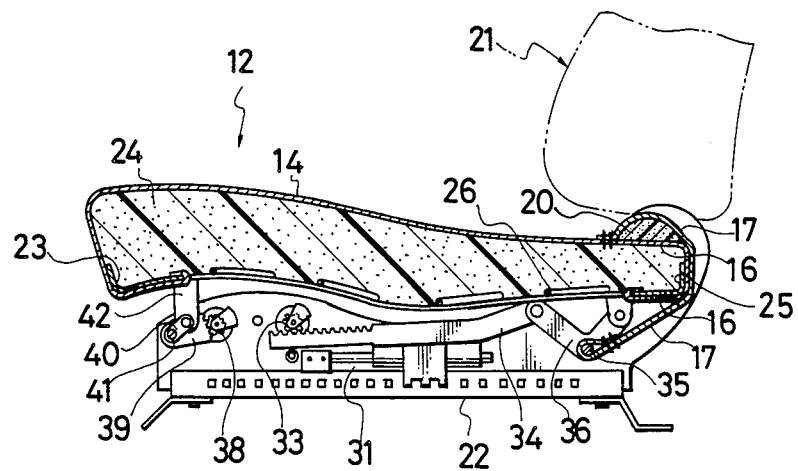
FIG. 3 is a section view of an automotive seat according to the invention, illustrating a state in which a seat cushion is lowered.
Figure 4:
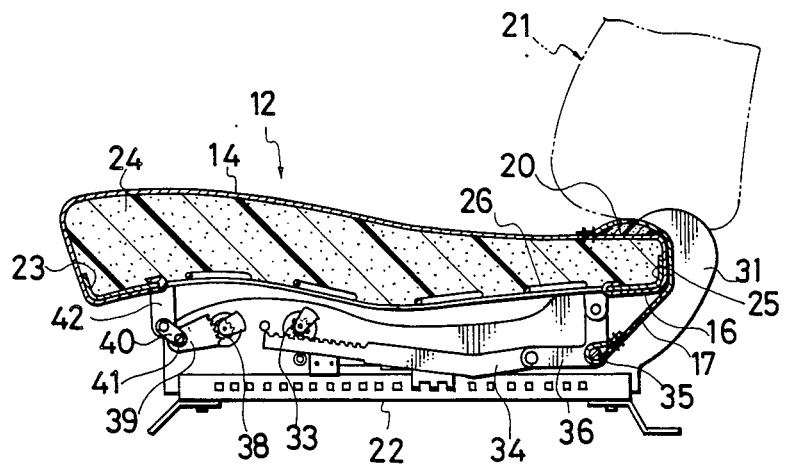
FIG. 4 is a section view of an automotive seat according to the invention, illustrating a state in which a seat cushion is raised.

In FIG. 3, there is shown a state of an automotive seat according to the present invention in which the rear portion of a seat cushion (12) is lowered by a lifter, and, in FIG. 4, there is shown another state of the above seat in which the rear portion of the seat cushion (12) is raised by the lifter. This seat cushion (12) is constructed such that it can be raised or lowered by the lifter, as in prior art ones. Specifically, the seat cushion (12) is integrally mounted via the lifter to right and left slide rails (22) which are used to adjust the front and rear positions of the automotive seat and also is mounted to brackets (31) which are respectively erected above the slide rails (22). The right and left slide rails (22) are fixed to a car floor, respectively. Each of the brackets (31) has a rear portion which is formed further higher than the remaining portions thereof, and a seat back (21) is connected to the higher rear portion of the bracket by means of a reclining device (which is not shown).

Figure 5:
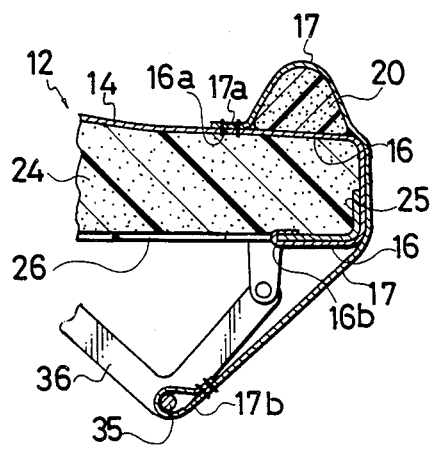
FIG. 5 is a partially enlarged section view of the above seat of the invention shown in FIG. 3.

There is provided a cover (14) which forms the top cover member of the seat cushion (12) and the rear end portion of the cover (14) is constructed as a dual structure which comprises inner and outer covers 16 and 17, as shown in FIG. 5. Between the inner and outer covers 16, 17, there is stored a resilient member 20 which comprises a foam member such as urethane foam. Also, the above-mentioned slide rails (22) are fixed to the car floor below and laterally of the seat cushion (12).

Figure 1:
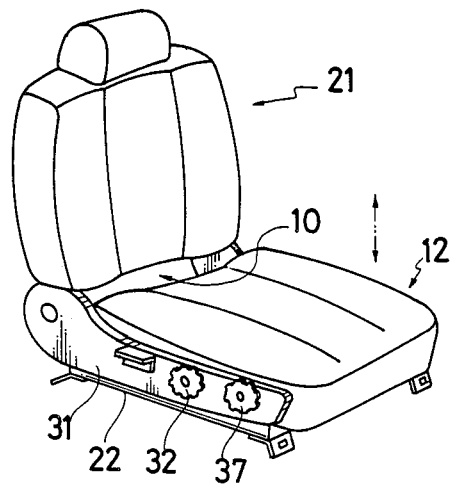
FIG. 1 is a perspective view of a conventional automotive seat.
Figure 2:
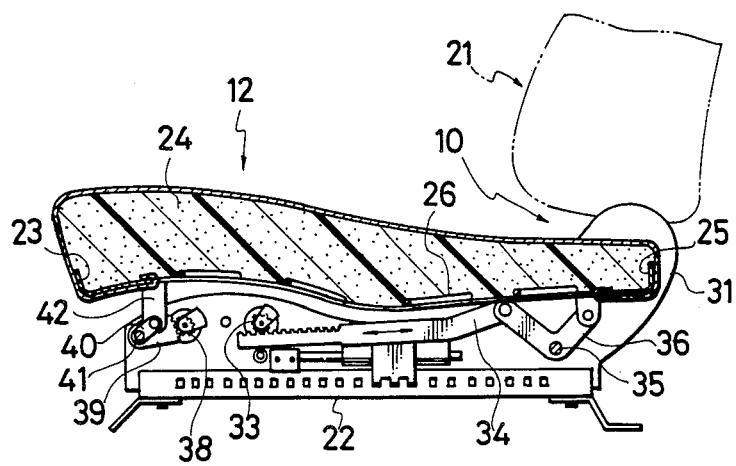
FIG. 2 is a section view of the above conventional automotive seat.

Since the structures of the above-mentioned slide rails (22) and lifter are the same as in the before-mentioned prior art seat (FIGS. 1 and 2), the description thereof is omitted here.

The above-mentioned outer cover (17) has a front end (17a) which is sewn to the cover (14). The cover (14) extends while covering the front surface of a foam pad (24) forming the seat cushion (12), and is connected to a cushion frame (23) in front of the lower surface of the seat cushion. Also, the outer cover (17) has a rear end (17b) which extends so as to cover the rear end face of the seat cushion (12) and is then connected to a shaft (35) of a connecting link (36).

On the other hand, the front surface (16a) of the inner cover (16) is connected to the outer cover (17) at a position slightly spaced from the resilient member (20), for example by means of sewing. The rear end (16b) of the inner cover (16) is connected to a cushion frame (25) located backwardly of the lower surface of the seat cushion (12).

With the above-mentioned structure, at a lowered position as shown in FIG. 3, the resilient member (20) is expanded sufficiently to be abutted against the rear end of the seat back (21). As a result of this, the spacing between the seat cushion (12) and the seat back (21) can be securely closed. Also, in this structure, due to the fact that the resilient member (20) is disposed within the cover (14) that forms the top cover member of the seat cushion and thus is not exposed externally, there is eliminated the possibility that the quality of the appearance of the seat may be damaged. Further, unlike a case in which a sheet is simply stretched, since the above spacing is closed by use of the resilient member (20) showing a qualitative and quantitative feeling, all of a qualitative and quantitative feeling, a weighty feeling and a high-grade feeling can be obtained. In addition, as will be discussed later, even when the seat cushion (12) is raised by the lifter, the spacing can be closed securely.

By the way, the spacing between the slide rail (22) and the seat cushion (12) is widened with the rising of the seat cushion (12) and, as a result of this, there arises a possibility that the lifter provided on the slide rail (22) can be observed from behind through the widened spacing. However, in the above structure according to the invention, due to the fact that the respective ends of the inner and outer covers (16), (17) are treated in a suitable manner, there is eliminated the possibility that the lifter can be viewed from outside.

In other words, the rear end (17b) of the outer cover (17) is connected to the shaft (35), as discussed before. However, even when the connecting link (36), which is provided on the brackets (31) on the slide rails (22) and is rotatably mounted to the shaft (35), is rotated, the shaft (35) is prevented from moving in the vertical as well as right and left directions. Therefore, the rear end (17b) of the outer cover (17) remains at a fixed position which is independent of the rising of the seat cushion (12). Also, since the front end (16a) of the inner cover (16) is sewn to the front end (17a) of the outer cover (17) and the rear end (16b) thereof is connected to the cushion frame (25), the inner cover (16) remains unchanged in position. And, according to the invention, the length of the outer cover (17) is set in such a manner that the resilient member (20) is pressed and contracted by the outer cover (17) before it is abutted against the lower end of the seat back (21) and contracted thereby. Thanks to this, if the lifter is operated to elevate the seat cushion (12), then the resilient member (20) is pressed by the outer cover (17) and compressed between the inner and outer covers (16), (17), according to the elevation of the seat cushion (12). As a result of this, the resilient member (20) closes the spacing between the seat cushion (12) and the seat back (21) quite naturally (see FIG. 4). Here, it should be noted that the rear end (17b) of the outer cover (17) must only be connected to a fixed member which is independent of the rising and lowering of the seat cushion (12). That is, it can be understood quite easily that the outer cover rear end may be connected to the other members than the shaft (35) of the connecting link (36). In the drawings, reference numeral (26) designates a spring member which is provided on the cushion frame (25) and is adapted to support the above-mentioned pad (24).

In a well known structure in which a resilient member is pressed against the lower end of the seat back (21) for compression, the resilient member cannot be deformed flat. That is, the resilient member is changed into a swollen shape around the portion thereof where it is abutted against the lower end of the seat back (21), which impairs the quality of the apperance of the seat. Also, since such deformation occurs only locally, partial breakage or damage may be easily produced in the resilient member, which means that there is a possibility of the life of the resilient member being shortened.

In contrast, according to the present invention, the resilient member (20) is compressed and deformed not by the abutment thereof with the seat back (21) but by the pressure by the outer cover (17) according to the rising of the seat cushion (12). Since such deformation of the resilient occurs in a flat manner, the quality of the apperance of the seat will never be impaired. Also, the resilient member is deformed not locally but comparatively evenly and thus the deformation has no ill effect on the life of the resilient member. In addition, according to the invention, due to the fact that the outer cover (17) is always stretched by the resiliency of the resilient member (20) according to the rising of the seat cushion (12), there eliminated the possibility that the outer cover (17) may hang down.

As can be understood from the foregoing description, according to the present invention, the spacing between the seat cushion (12) and the seat back (21) can be securely closed by the resilient member (20), without impairing the quality of the appearance of the seat. Further, the spacing between the seat cushion and the slide rail (22), which is extended according to the rising of the seat cushion (12), can also be closed by the outer cover (17) all the time. Accordingly, the lifter located on the slide rails is always covered by the outer cover (17) and thus it is always kept from rearward sight. That is, the present invention does not damge the quality of appearance in this respect as well.

In the prior art structures, since the lifter is located in sight, there is the possibility that the tiptoe or hand of an occupant in the rear seat may be caught in the lifter by mistake. Especially, such accidents can occur easily when the rear seat occupant is a child.

However, according to the present invention, because the outer cover stands in the way, the rear seat occupant is not able to approach the lifer. For this reason, there is eliminated the possibility that the tiptoe or the like may be caught in the lifer and thus the invention is advantageous in safety as well.

According to the invention, another structure may also be employed in which the resilient member (20) is compressed slightly by the lower end of the seat back (21), provided that the appearance quality of the seat is not damaged.

Now, if the lifter is operated to lower the seat cushion (12), then the pressure by the outer cover (17) is decreased according to the lowering distance of the seat cushion (12). As a result of this, the resilient member (20) is restored to its original state or is expanded between the inner and outer covers (16), (17) so as to close the spacing between the seat cushion and the seat back. During this, the cover (17) is sufficiently stretched by the resiliency of the resilient member (20), that is, the outer cover (17) is prevented from hanging down all the time.

Figure 6:
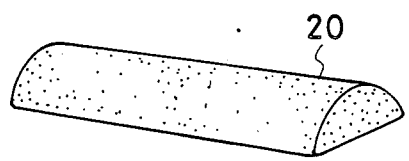
FIG. 6 is a perspective view of a resilient member of foam material employed in the invention.
Figure 7:
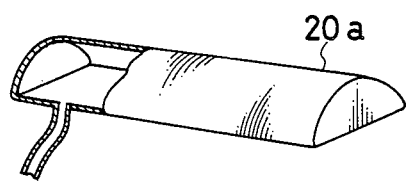
FIG. 7 is a perspective view of a resilient member of an air bag employed in the invention.

As shown in FIG. 6, when the resilient member (20) is formed of foam material such as urethane foam, there can be provided an advantage that the structure is not complicated but simplified. However, according to the invention, the structure of the resilient member (20) is not always limited to this. For example, as shown in FIG. 7, the resilient member may be composed as an air bag (20a) connected to air supply means in an expandable and contractible manner.

It should be understood, however, that there is no intention to limit the invention to the specific forms disclosed but, on the contrary, the invention is to cover all modifications, alternate constructions and equivalents falling within the spirit and scope of the invention as expressed in the appended claim.

As has been described heretofore, according to the invention, the resilient member is compressed and contracted by the outer cover according to the rising of the seat cushion while the resilient member is restored and expanded against the pressure of the outer cover when the seat cushion is lowered. Such expansion and contraction of the resilient member occurs not locally but results in the flat deformation of the resilient member, which eliminates the possibility of the appearance quality of the seat being impaired. Also, the comparatively even deformation of the resilient member has no ill effect on the life of the resilient member. Further, the outer cover is stretched by the resiliency of the resilient member according to the rising and falling of the seat cushion, with the result that the outer cover is always prevented from hanging down. In addition, the spacing between the seat cushion and the slide rails, which is enlarged according to the rising of the seat cushion, is also covered all the time by the outer cover. For this reason, the lifter on the slide rails is covered by the outer cover and thus is always kept from backward sight. Thanks to this, there is eliminated the possibility that the quality of the appearance of the seat can be impaired in this respect as well. At the same time, there is avoided a possibility of the tiptoe or the like of the rear seat occupant being caught in the lifer, which improves the safety of the seat.

What is claimed is:

1. An automotive seat comprising a seat cushion raisable and lowerable vertically by a lifter with respect to brackets integrally mounted to slide rails and a seat back fixed at a constant height, wherein an expandable and contractible resilient member is disposed at a position on the upper surface of said seat cushion to which the lower end portion of said seat back faces, and said resilient member is covered by a cover so as to close a spacing between said seat cushion and said seat back.

2. An automotive seat as set forth in claim 1, wherein the rear end portion of said cover of said seat cushion is composed of inner and outer covers, said resilient member expandable and contractible according to said spacing between said seat back and seat cushion is stored between said inner and outer covers, the front end of said inner cover is connected to said outer cover, the rear end of said inner cover is connected to a seat cushion frame, and the rear end of said outer cover is connected to a fixed member which has no connection with the rising and lowering of said seat cushion.

3. An automotive seat as set forth in claim 1, wherein said resilient member comprises a foam material such as urethane foam or the like.

4. An automotive seat as set forth in claim 1, wherein said resilient member comprises an air bag connected to an air supply means.

5. An automotive seat as set forth in claim 2, wherein the length of said outer cover is set in such a manner that when said seat cushion is lowered said outer cover covers said resilient member without pressing against it, and that said outer cover can press against said resilient member when said seat cushion is raised.

6. An automotive seat as set forth in claim 2, wherein said fixed member comprises a shaft provided across said brackets mounted integrally to said right and left slide rails and there is mounted to said shaft a connecting link which is used to said seat cushion in a raisable and lowerable manner.

* * * * *